(12) United States Patent
Sheem et al.

(10) Patent No.: US 7,074,521 B2
(45) Date of Patent: Jul. 11, 2006

(54) NEGATIVE ACTIVE MATERIAL FOR RECHARGEABLE LITHIUM BATTERY AND METHOD OF PREPARING SAME

(75) Inventors: Kyou-Yoon Sheem, Cheonan-si (KR); Sang-Jin Kim, Cheonan-si (KR); Sang-Young Yoon, Cheonan-si (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/512,394

(22) Filed: Feb. 24, 2000

(65) Prior Publication Data

US 2004/0214087 A1    Oct. 28, 2004

(30) Foreign Application Priority Data

Feb. 24, 1999 (KR) .................................. 1999-6099
Oct. 4, 1999 (KR) .................................. 1999-42681

(51) Int. Cl.
H01M 4/58 (2006.01)
H01M 4/60 (2006.01)

(52) U.S. Cl. .............................. 429/231.4; 429/231.95; 429/212

(58) Field of Classification Search ............. 429/231.4, 429/231.6, 231.95, 212, 231.8
See application file for complete search history.

(56) References Cited

U.S. PATENT DOCUMENTS

| | | | | |
|---|---|---|---|---|
| 5,482,797 A | * | 1/1996 | Yamada et al. | 429/218 |
| 5,624,606 A | * | 4/1997 | Wilson et al. | 252/506 |
| 5,772,934 A | * | 6/1998 | MacFadden | 264/42 |
| 5,972,537 A | * | 10/1999 | Mao et al. | 429/231.8 |
| 6,027,833 A | * | 2/2000 | Ueda et al. | 429/218.1 |
| 6,103,423 A | * | 8/2000 | Itoh et al. | 429/231.8 |
| 6,337,159 B1 | * | 1/2002 | Peled et al. | 429/231.4 |
| 6,355,377 B1 | * | 3/2002 | Sheem et al. | 429/231.8 |
| 6,395,427 B1 | * | 5/2002 | Sheem et al. | 429/231.8 |

FOREIGN PATENT DOCUMENTS

| | | |
|---|---|---|
| JP | 5-325948 | 12/1993 |
| JP | 6-36760 | 2/1994 |
| JP | 6-84516 | 3/1994 |
| JP | 6-275270 | 9/1994 |
| JP | 8-31422 | 2/1996 |
| JP | 8-180903 | 7/1996 |
| JP | 8-306359 | 11/1996 |
| JP | 9-63584 | 3/1997 |
| JP | 9-63585 | 3/1997 |

OTHER PUBLICATIONS

Journal of the Electrochemical Society, vol. 137, No. 7, (Jul. 1990) 2009.

* cited by examiner

Primary Examiner—Patrick Joseph Ryan
Assistant Examiner—Julian Mercado
(74) Attorney, Agent, or Firm—Blakely, Sokoloff, Taylor & Zafman

(57) ABSTRACT

A negative active material for a rechargeable lithium battery is provided. The negative active material includes a core and a carbon shell formed around the core. The core includes a crystalline carbon, an amorphous carbon or a mixture thereof, and the carbon shell includes an amorphous carbon with a metal selected from a transition metal, a semi-metal, an alkali metal or an alkali earth metal.

6 Claims, 4 Drawing Sheets

NEGATIVE ACTIVE MATERIAL FOR RECHARGEABLE LITHIUM BATTERY AND METHOD OF PREPARING SAME

CROSS REFERENCE TO RELATED APPLICATION

This application is based on applications Nos. 99-42681 and 99-6099 filed with in the Korean Industrial Property Office on Oct. 4, 1999 and Feb. 24, 1999, the content of which is incorporated hereinto by reference.

BACKGROUND OF THE INVENTION (a) Field of the Invention

The present invention relates to a negative active material for a rechargeable lithium battery and a method of preparing the same and, more particularly, to a negative active material for a rechargeable lithium battery which exhibits high reversible capacity and low irreversible capacity.

(b) Description of the Related Art

Rechargeable lithium batteries such as lithium ion batteries, and lithium ion polymer batteries employ carbonaceous materials for the negative active materials. The carbonaceous materials can be largely classified into two categories of crystalline graphite and amorphous carbon. Crystalline graphite includes nature graphite and artificial graphite, the artificial graphite being obtained by sintering pitch at 2000° C. Amorphous carbon exhibits low degree of graphitization and displays very weak peaks in X-ray diffraction. Amorphous carbon includes soft carbon obtained by sintering coal pitch or petroleum pitch, and hard carbon obtained by sintering a polymer resin such as phenol resin.

Crystalline graphite exhibits good voltage flatness and high charge/discharge efficiency. With regard to amorphous carbon, although this material exhibits a high discharge capacity, it has a high irreversible capacity, low charge/discharge efficiency, and bad voltage flatness. Therefore, crystalline graphite is generally used for the negative active material in the rechargeable lithium battery.

When this active material (i.e., crystalline graphite) is coated on an electrode plate and pressed, the irregularly-shaped active material become fully aligned. Thus, a basal plane of the active material, to which lithium ions are not easily intercalated and deintercalated, makes contact with an electrolyte. Furthermore, since a graphene sheet develops in edge portions of the crystalline graphite, side reactions with an electrolyte become more severe. Thus, it is difficult to use crystalline graphite in rechargeable lithium batteries which require high initial charge and discharge efficiency (Journal of Electrochemical Society 137 (1990) 2009). In particular, if an electrolyte including propylene carbonate is used in the lithium secondary battery utilizing crystalline graphite as the negative active material, the crystalline graphite layer is separated from the electrode because of the co-intercalation of the electrolyte. As a result, the lithium ions do not intercalated and deintercalated in a normal fashion such that the initial efficiency of the active material and the capacity of the battery are reduced.

To address such problems, there have been attempts to produce carbonaceous material made out of a mixture of both crystalline carbon and amorphous carbon, thereby obtaining the advantages of both these materials.

Japanese Patent Laid-open No. Hei 8-180903 discloses a method of coating amorphous carbon on crystalline graphite. Japanese Patent Laid-open No. Hei 6-36760 discloses a method in which graphite particles are physically mixed with amorphous carbon fiber. Japanese Patent Laid-open No. Hei 6-275270 discloses a method in which crystalline graphite is physically mixed with amorphous carbon and the mixture is coated on a phenol resin. Japanese Patent Laid-open No. Hei 6-84516 discloses a method of coating graphite with amorphous cokes. Japanese Patent Laid-open No. Hei 5-325948 discloses a method of producing a composite of crystalline graphite and amorphous resin. In the methods, the amorphous resin is produced by cross-linking amorphous carbon.

Although the active materials obtained by the above methods exhibit the advantages of both crystalline graphite and amorphous carbon, the disadvantages of these two materials also appear in the resulting active material.

There have been attempted to decrease irreversible capacity by adding a catalyst to the active material. The methods using boron-based compounds as the catalyst are disclosed in Japanese Patent Laid-open No. Hei 8-31422, Hei 9-63584, Hei 9-63585, Hei 8-306359 and Hei 8-31422. In these methods, carbonaceous material is mixed with boron-based compounds and the mixture is heat-treated.

However, since the heating process is performed at 2000° C. higher in these methods, the methods are not economical. Although some examples in the above Japanese patent utilize a process in which natural graphite is wetted with a boron aqueous solution and carbonized at 1000° C. to obtain an improvement in electrical properties, graphite does not react well with boron at 1000° C. That is, these examples and their attendant advantages are based on an assumption of a direct reaction between boron and crystalline graphite. However, it is well known that boron-based compounds react with graphite at 2100° C., thus it is difficult to obtain the desired effect based on the direct reaction between boron and crystalline graphite.

SUMMARY OF THE INVENTION

It is an object of the present invention to provide a negative active material for a rechargeable lithium battery which can prevent side reaction during charge and discharge, and exhibits good reversible capacity and low irreversible capacity.

It is another object to provide a negative active material for a rechargeable lithium battery, which exhibits improved high-rate charge and discharge characteristics, as well as improved cycle life characteristics.

It is still another object to provide a method of preparing the negative active material for a rechargeable lithium battery, in which the negative active material can be easily produced.

These and other objects may be achieved by a negative active material for a rechargeable lithium battery including a core and a carbon shell formed around the core. The core includes a crystalline carbon, an amorphous carbon or a mixture thereof. The carbon shell includes an amorphous carbon and a metal selected from a transition metal, a semi-metal, an alkali metal or an alkali earth metal. The core may be formed with mono-particles or secondary particles. The secondary particle is produced by agglomerating at least one primary particle.

In order to achieve these and others objects, the present invention provides a method of preparing a negative active material for a rechargeable lithium battery. In this method, an amorphous carbon precursor is mixed with a compound including a metal selected from a transition metal, a semi-metal, an alkali metal or an alkali earth metal. The mixture is added to an organic solvent to prepare an amorphous carbon precursor solution. Thereafter, the amorphous carbon precursor solution is coated on a crystalline carbon, an amorphous carbon or a mixture thereof. An agglomerating step may be further performed at substantially the same time as the coating step.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 4:
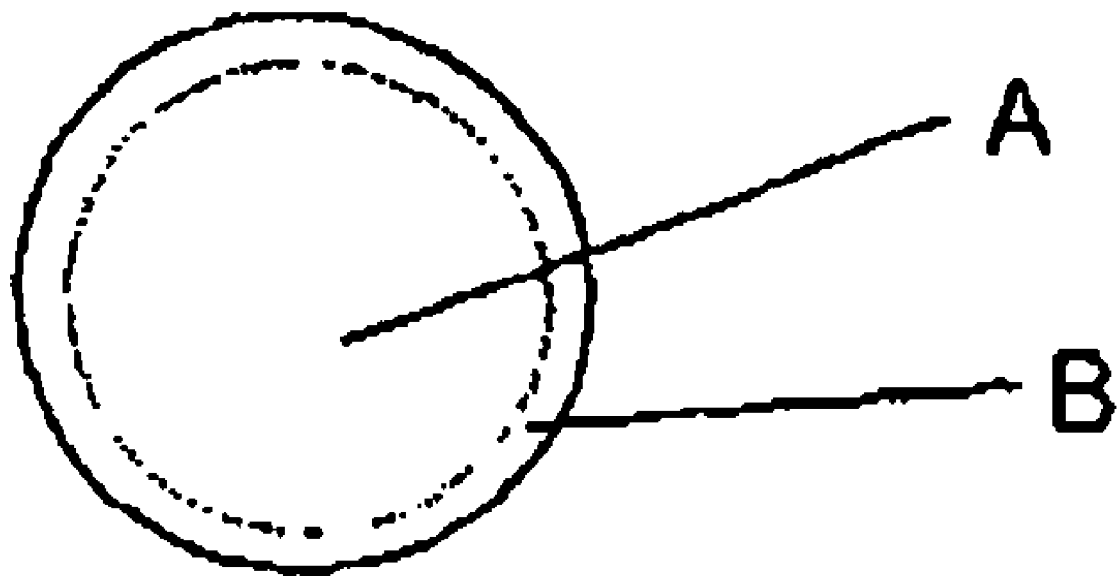
FIG. 4 illustrates a sectional view showing a structure of the negative active material of one embodiment of the present invention.

As shown in FIG. 4, a negative active material of the present invention includes a core A and a carbon shell B formed around the core. The core includes a crystalline carbon, an amorphous carbon and a mixture thereof, and the carbon shell includes an amorphous carbon and metals. The carbon shell has neither an amorphous structure nor a crystalline structure, but instead has an intermediate structure between an amorphous structure and a crystalline structure, resulting in improved capacity and efficiency.

The core is formed with mono-particles, or secondary particles. The secondary particle is produced by agglomerating at least one primary particle, which has a particle size smaller than that of the mono-particles. In the present application, "mono-particles" refer to particles with an average diameter of about 15 to 30 μm and "primary particles" refer to particles with an average diameter of less than 15 μm.

A method of preparing the negative active material of the present invention will be described in more detail.

1) The Use of Mono-Particles

An amorphous carbon precursor with an average diameter of 15 to 30 μm is added to a solvent. That is, the amorphous carbon precursor is dissolved, melted, softened or distributed in the solvent. For the amorphous carbon precursor, it is possible to use coal pitch, petroleum pitch, coal oil, petroleum heavy oil or a polymer resins such as phenol resin, furan resin or polyimide resin. Preferably, coal pitch or petroleum pitch is used because these materials help in obtaining a high capacity and a low irreversible capacity. More preferably, an organic solvent soluble pitch is used. The organic solvent soluble pitch is prepared by dissolving coal pitch or petroleum pitch in an organic solvent, after which organic solvent insoluble components are extracted from the resulting mixture.

The solvent, to which the amorphous carbon precursor is added, may be an organic solvents or inorganic solvents. Examples thereof are toluene, tetrahydrofuran, benzene, methanol, ethanol, hexane, cyclohexane, water or a mixture thereof.

After adding the amorphous carbon precursor to the solvent, a compound including metal is added to the resulting solution to prepare an amorphous carbon precursor solution. The metal may be in the form of a solid or liquid. The metal is selected from a transition metal, a semi-metal, an alkali metal or an alkali earth metal. The transition metal is preferably selected from Ni, Co, Fe, Mo or Cr; the semi-metal is preferably selected from B, Al, Ga, Si, or Sn, the alkali metal is preferably selected from Na or K; and the alkali earth metal is preferably selected from Mg or Ca. The compound including B may be boric acid or boron oxide; the compound including Ni may be nickel nitrate, nickel sulfate or nickel acetate; and the compound including Si may be silicate or tetraethyl orthosilicate. The organic solvent, to which the amorphous carbon precursor is added, should be such that it is able to dissolve metals and be compatible with the solvent for dissolving amorphous carbon precursor. Examples of the organic solvent are ethanol, isopropyl alcohol, toluene, benzene, hexane or tetrahydrofuran.

The amorphous carbon precursor solution is coated on a core of a crystalline carbon, an amorphous carbon or a mixture thereof. The crystalline carbon is shapeless, disk-shaped, flaked, globular or fibrous forms, or a mixed form thereof. The crystalline carbon may be natural graphite or artificial graphite. The amorphous carbon may be cokes, soft carbon or hard carbon.

The crystalline carbon particles preferably have an average particle size of 0.1 to 35 μm. If the average particle size is less than 0.1 μm, use of the particle is not possible, while the average particle size is more than 35 μm, overly large macro particles are formed during the agglomeration process such that an uneven surface or lines are formed on an electrode, resulting in a decrease in the cycle life of the battery.

The coating step is performed by mixing the core with the amorphous carbon precursor solution, spray-drying the amorphous carbon precursor solution to the core, spray-pyrolyzing of the amorphous carbon precursor solution onto the core or freeze-drying the amorphous carbon precursor solution to the core. Although the coated core can be directly used as the active material, it is preferable to further perform a carbonizing step. The carbonizing step is performed by heating the coated particle at 800 to 1500° C.

Optionally, a polymerizing step or a stabilizing step is further performed, prior to the carbonizing step. The polymerizing step may be performed by any method known in the related art. The stabilizing step is performed at temperatures range plus or minus 100° C. of the softening point of the amorphous carbon, for example, at a temperature range from 80 to 350° C. When the polymerizing step or stabilizing step is performed, lithium ions can easily intercalated or deintercalated into or from the resulting active material.

The resulting active material includes a core with mono-particle and a carbon shell formed around the core. The core includes a crystalline carbon, an amorphous carbon or a mixture thereof. The carbon shell includes a transition metal such as Ni, Co, Fe, Mo or Cr; a semi-metal such as B, Al, Ga, Si, or Sn, an alkali metal such as Na or K; or an alkali earth metal such as Mg or Ca. The amount of the metals in the active material is 0.1 to 25 wt % of the core. If the amount of the metal is less than 0.1 wt %, any effect of adding the metal to the active material is not realized, whereas, if the amount of the metal is more than 25 wt %, the strength of the bond between the active material and a binder is reduced. The negative active material of the present invention has a surface with an intermediate structure between an amorphous structure and a crystalline structure, the intermediate structure being realized by adding metals to an amorphous carbon.

2) The Use of Secondary Particles

A negative active material is produced by the same procedure as with mono-particles except that primary particles are used instead of mono-particles and the coating step is simultaneously performed with an agglomeration step. An average particle size of the primary particles is less than that of the mono-particle. The primary particles are agglomerated to produce the secondary particles.

The coating-agglomerating step is performed by mixing and agglomerating a crystalline carbon, an amorphous carbon and a mixture thereof to form a core with the amorphous carbon precursor solution, spray-drying the solution to the core, spray-pyrolyzing the solution onto the core or freeze-drying the solution to the core. At this time, secondary particles are produced. The secondary particles constitute a core. The amorphous carbon solution is coated on the secondary particles. In the coating and agglomerating step, the amorphous carbon precursor solution acts a binder, which helps to agglomerate primary particles. If spray-drying is performed, globular secondary particles are produced. If the other coating methods are performed, shapeless secondary particles are produced.

The resulting active material includes a core of secondary particles and a carbon shell formed around the core. The core includes the secondary particles agglomerated with primary particles and the primary particles include a crystalline carbon, an amorphous carbon or a mixture thereof. The carbon shell includes an amorphous carbon and a transition metal such as Ni, Co, Fe, Mo or Cr; a semi-metal such as B, Al, Ga, Si, or Sn, an alkali metal such as Na or K; or an alkali earth metal such as Mg or Ca.

The amount of the metals in the active material is 0.1 to 25 wt % of the core. If the amount of the metal is less than 0.1 wt %, any effect of adding the metal to the active material is not realized, whereas, if the amount of the metal is more than 25 wt %, the strength of bond between the active material and a binder is reduced. The negative active material of the present invention has a surface with an intermediate structure between an amorphous structure and a crystalline structure, the intermediate structure being realized by coating an amorphous carbon including metals on a crystalline carbon, an amorphous carbon or a mixture thereof.

Microporous channels are formed between the primary particles or mono-particles, particularly, primary particles. The microporous channels, which are spaces formed between the primary particles or mono-particles, are realized as a result of the globular, disk, flake, or fibrous form of the primary particles or mono-particles. The microporous channels act to enable easy immersion of the electrolyte into the negative electrode, thereby improving high-rate charge/discharge and cycle life characteristics of the battery.

The negative active material has a plane distance of $d_{002}$ of 3.35 to 3.7 Å of X-ray diffraction plane distance at the (002) plane. The negative active material of the present invention has at least one shoulder in differential thermal analysis at 700° C. or more.

The surface of the negative active material has neither an amorphous structure nor a crystalline structure, but instead has an intermediate structure between an amorphous structure and a crystalline structure, resulting in improved capacity and efficiency.

In order to develop a negative active material that exhibits advantages of both a crystalline carbon and an amorphous carbon, this inventor conventionally applied a procedure in which polymer materials are coated on graphite, or in which an agglomeration process is used. The resulting material includes a graphite core and an only amorphous carbon shell formed around the core. The method is based on the principles that the graphite core increases the crystallinity of the amorphous carbon layer during carbonization and that the surrounding of the amorphous carbon around the core prevents contact between the core and an electrolyte.

Side reactions between graphite and electrolyte, which may be occurred at edge portions of graphite during the intercalation and deintercalation of lithium ions, are prevented. Here, although the graphite core increases the crystallinity of the amorphous carbon layer, the layer completely does not lose its inherent characteristics, resulting in increased irreversible capacity and a decreases in efficiency. The layer may be thinly formed to limit such problems caused by the carbon layer, but forming the layer too thinly results in separation from the core during charge/discharge cycles, thereby causing decreases in cycle life.

Contrarily, the negative active material of the present invention has am intermediate surface structure between an amorphous structure and a crystalline structure such that irreversible capacity caused by an amorphous carbon, is reduced and has an intermediate structure layer surrounding the core such that drawbacks caused by a crystalline core can be prevented. Furthermore, as the carbon shell has an intermediate structure, the carbon shell can be formed to a relatively substantial thickness to prevent the problem of the shell separation. The carbon shell can prevent the electrolyte decomposition and has no inherent characteristics such as high irreversible capacity and bad voltage flatness.

The present invention is explained in more detail with reference to the following examples. The invention can be utilized in various ways and is not intended to be confined to the examples.

EXAMPLE 1

Coal pitch was treated with toluene to remove toluene-insoluble components. The residual toluene-soluble pitch was dissolved in toluene. The toluene solution was mixed with a boron trioxide ethanol solution at a volume ratio of 1:30 to produce an amorphous carbon precursor solution.

300 g of a mixture, including natural graphite having a size of about 18 μm and disk-shaped artificial graphite having a size of about 8 μm at a weight ratio of 3:2, was placed in an agglomaster (AGM-2, Hosokawa Micron company) and dried to produce a crystalline core.

Thereafter, 500 g of the amorphous carbon precursor solution was sprayed on the crystalline core at a rate of about 13 g/min. At this time, a weight ratio between the core and the amorphous carbon precursor was 5:2. The mixed material was rotated on a circular plate at 500 rpm such that primary particles were agglomerated to produce secondary particles. The globular material was dried and heat-treated at 1000° C. for 2 hours. As a result, a negative active material was produced.

EXAMPLE 2

A negative active material was produced by the same procedure in Example 1 except that tetraethyl orthosilicate was used instead of the boron trioxide.

EXAMPLE 3

A negative active material was produced by same procedure in Example 1 except that a Ni sulfate ethanol solution was used instead of the boron trioxide ethanol solution.

COMPARATIVE EXAMPLE 1

Coal pitch was treated with toluene to remove toluene-insoluble components. The residual toluene-soluble pitch was carbonized at 1000° C. to produce an amorphous carbon. The amorphous carbon material was used for a negative active material.

COMPARATIVE EXAMPLE 2

90 wt % of natural graphite was mixed with 10 wt % of an amorphous carbon prepared in Comparative example 1. The mixed material was used for a negative active material.

COMPARATIVE EXAMPLE 3

A mixture of natural graphite and artificial graphite used in Example 1 was used for a negative active material.

COMPARATIVE EXAMPLE 4

A negative active material was produced by the same procedure in Example 1 except that the boron trioxide ethanol solution was not used.

Each of the active materials according to Examples 1–3 and Comparative examples 1 to 4 was mixed with a polyvinylidene fluoride binder in N-methyl pyrrolidone to make a slurry. The slurry was cast on a copper foil collect to produce a negative electrode. Using the negative electrode and metallic lithium for a reference electrode, a rechargeable lithium battery was manufactured. 1M $LiPF_6$ in ethylene carbonate and dimethyl carbonate was used for an electrolyte.

Reversible capacity, irreversible capacity, discharge efficiency, high-rate capacity (1C) and cycle life of the cells according to Examples 1 to 3 and Comparative examples 1 to 4 were measured and the results are presented in Table 1. In Table 1, discharge efficiency is indicated by a ratio of discharge capacity to charge capacity (discharge capacity/charge capacity) and cycle life is indicated by a percentage value of capacity based on an initial capacity after $100^{th}$ charge/discharge cycles. In Table 1, "Com." refers to comparative example.

TABLE 1

| | Reversible capacity [mAh/g] | Irreversible capacity [mAh/g] | Discharge efficiency [%] | High-rate capacity (1 C) [mAh/g] | Cycle life [%] |
|---|---|---|---|---|---|
| Example 1 | 359 | 31 | 92 | 355 | 80 |
| Example 2 | 352 | 35 | 91 | 350 | 78 |
| Example 3 | 352 | 36 | 91 | 349 | 78 |
| Com. 1 | 261 | 84 | 76 | 241 | 72 |
| Com. 2 | 327 | 75 | 81 | 249 | 63 |
| Com. 3 | 335 | 70 | 83 | 265 | 58 |
| Com. 4 | 345 | 42 | 89 | 343 | 78 |

As shown in Table 1, reversible capacity of the cells according to Examples 1 to 3 is higher than that of Comparative examples 1 to 4. Also, irreversible capacity of the cells according to Examples 1 to 3 is lower than that of Comparative examples 1 to 4. This is the result of the negative active material of the present invention having an intermediate surface structure between an amorphous and crystalline structure. This is realized through the doped metals, resulting in the reduced irreversible capacity.

The cells according to Examples 1 to 3 have good charge and discharge efficiency, when compared to Comparative examples 1 to 4. In addition, the cells according to Examples 1 to 3 have good high-rate capacity and cycle life, when compared to Comparative examples 1 to 4. This is realized by the microporous channels, which allow the easy immersion of electrolyte into the negative active material.

The concentration of B on the surface of the negative active material according to Example 1 was measured by XPS, the measurements being made after performing sputtering for different time intervals. The results are shown in Table 2. Sputtering is a process in which heavy atoms are impacted on a surface of the active materials such that the surface thins. Accordingly, if boron is mostly remained on the surface rather than a core of the active material, the content of boron in active material is reduced by the sputtering process. When boron is mostly remained on the surface of the active material, boron makes a pitch to have semi-crystalline carbonaceous material during a low-temperature carbonizing step. In Table 2, the content of Si is excluded because it is less than 1%.

TABLE 2

| | (Unit: atomic concentration, at %) | |
|---|---|---|
| Example 1 | C 1s | B 1s |
| Initial | 85.97 | 1.06 |
| 2 min. after sputtering step | 83.79 | 0.69 |
| 10 min. after sputtering step | 84.51 | 0.34 |

As shown in Table 2, the content of boron in the active material of Example 1 was reduced as the sputtering process was performed. It is believed that boron was mainly remained on the surface of the active material rather than the core. As the measurement was initially performed with respect to the outermost area of the active material to which no processing step is performed, relatively large amounts of boron could be observed. In contrast, as the surface of the active material was gradually thinned through the sputtering process, the deep graphite structure of the active material was exposed and, hence, a reduced amount of boron was observed at the outmost area of the active material.

For analyzing the carbon shell having an intermediate structure between a crystalline and an amorphous structure, a differential thermal analysis of the active materials according to Example 1 and Comparative examples 1 to 4 was performed with a differential thermal analyzer from TA Instrument, Co. The differential thermal analysis was performed while the temperature was increased at a rate of 10° C./min from room temperature to 1200° C. under air atmosphere. The results are shown in FIG. 3 (example 1), FIG. 1 (Comparative examples 1 to 3) and FIG. 2 (Comparative example 4).

Figure 1:
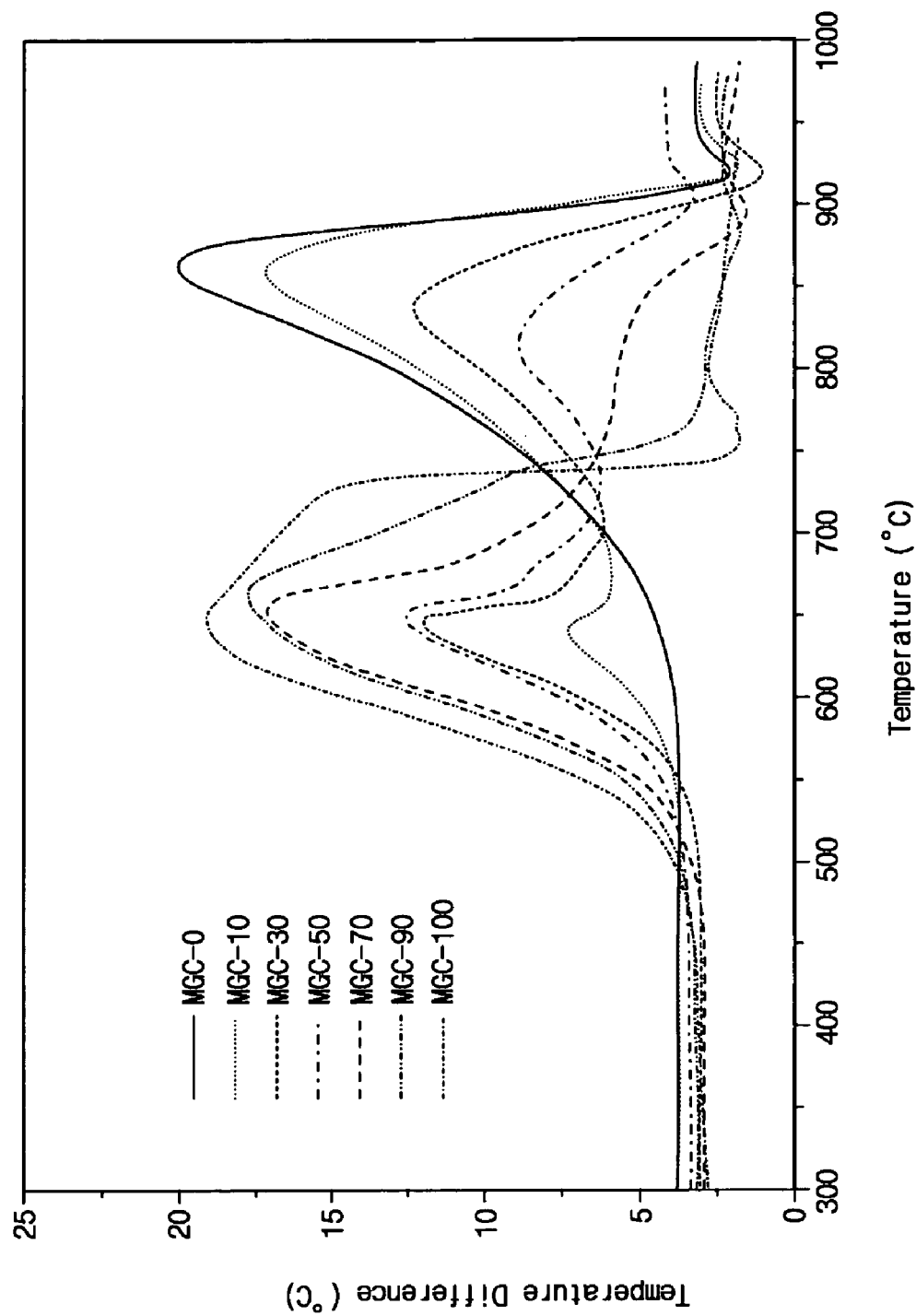
FIG. 1 is a graph illustrating results of differential thermal analysis performed on negative active materials according to Comparative examples 1 to 3.

When exothermic peaks of a carbonaceous material occur at 700° C. or less, the material is an amorphous carbon and when exothermic peaks occur at 700° C. or more, the material is a crystalline carbon. The results are shown in FIG. 1. In FIG. 1, the active material according to Comparative example 1 with only amorphous carbon has one exothermic peak occurring at under 700° C. The active material according to Comparative example 2 with a physical mixture of crystalline graphite and amorphous carbon has two exothermic peaks, one occurring at under 700° C.

due to the amorphous carbon and the occurring at over 700° C. due to the crystalline carbon. The active material according to Comparative example 3 with only crystalline graphite exhibits one exothermic peak at over 700° C.

Figure 2:
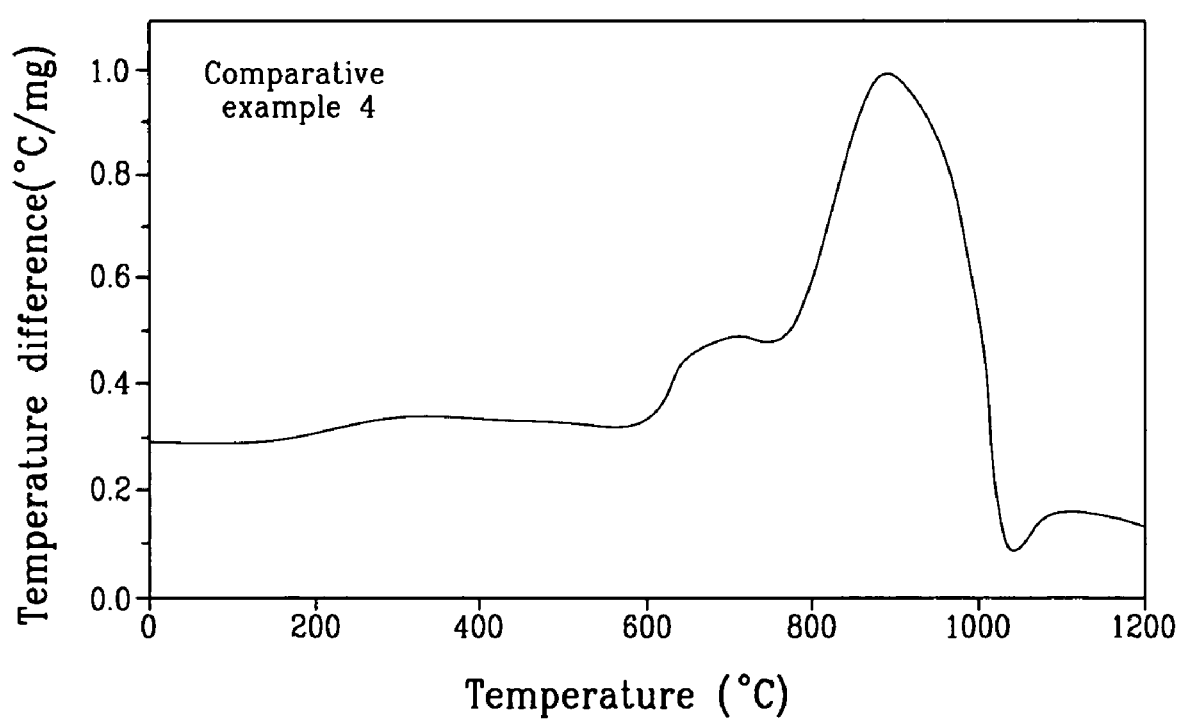
FIG. 2 is a graph illustrating results of differential thermal analysis performed on a negative active material according to Comparative example 4.
Figure 3:
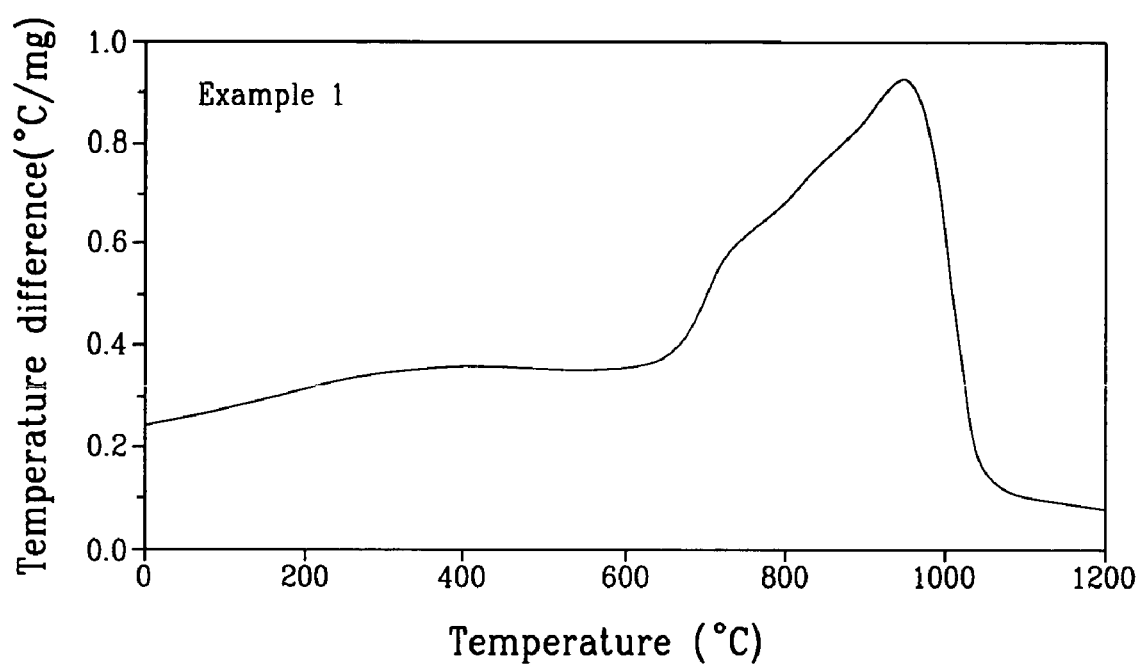
FIG. 3 is a graph illustrating results of differential thermal analysis performed on a negative active material according to Example 1.

FIG. 2 shows the differential exothermic peak of the active material according to Comparative example 4, in which crystalline carbon is coated with amorphous carbon that does not include boron oxide. As shown in FIG. 2, the exothermic peak due to the amorphous carbon appearing at less than 700° C. shifts to over 700° C.

The exothermic peak of the active material according to Example 3 presented in FIG. 3 is different from that of the active material according to Comparative Example 4. As shown in FIG. 3, no peak due to the amorphous carbon occurs at less than 700° C, and instead a shoulder occurs at 700 to 900° C. This result is caused by the crystallinity of the amorphous carbon increasing such that a peak due to the amorphous carbon appearing at less than 700° C. shifts to over 700° C. and overlaps with the crystalline peak. The active material of the present invention has an intermediate structure between an amorphous and crystalline structure. That is, by adding metals to the active material, the carbon shell is changed from an amorphous to a semi-crystalline structure, resulting in the prevention of side reactions of the graphite core and in the reduction of irreversible capacity.

The negative active material of the present invention exhibits good voltage flatness, high reversible capacity and low irreversible capacity by coating amorphous carbon including metals on crystalline carbon, amorphous carbon or a mixture thereof. Furthermore, with the application of the negative active material of the present invention to provide batteries, good high-rate charge and discharge characteristics are realized in the batteries by enabling the easily immersion of the electrolyte through the microporous channel.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a rechargeable lithium battery comprising:
   a core including crystalline carbon, amorphous carbon or a mixture thereof; and
   a carbon shell formed around the core, the carbon shell including carbon derived from amorphous carbon and having a semi-crystalline structure and at least one shoulder at 700° C. or more without a peak at less than 700° C. in differential thermal analysis, and the carbon shell including a metal, and the metal is Boron (B).

2. The negative active material of claim 1 wherein the amount of the metal is 0.1 to 25 wt % of the core.

3. The negative active material of claim 1 wherein the core has a planar distance of $d_{002}$ of 3.35 to 3.7 Å of an X-ray diffraction plane distance at a (002) plane.

4. A negative active material for a rechargeable lithium battery comprising:
   a core including secondary particles, the secondary particle being prepared by agglomerating at least one primary particle of a crystalline carbon, an amorphous carbon or a mixture thereof; and
   a carbon shell formed around the core, the carbon shell including carbon derived from amorphous carbon and having a semi-crystalline structure and at least one shoulder at 700° C. or more without a peak at less than 700° C. in differential thermal analysis, and the carbon shell including a metal, and the metal is Boron (B).

5. The negative active material of claim 4 wherein the amount of the metal is 0.1 to 25 wt % of the core.

6. The negative active material of claim 4 wherein the core has a planar distance of $d_{002}$ of 3.35 to 3.7 Å of an X-ray diffraction plane distance at a (002) plane.

* * * * *